(12) United States Patent
Uchida

(10) Patent No.: US 11,394,845 B2
(45) Date of Patent: Jul. 19, 2022

(54) IMAGE FORMING APPARATUS, METHOD OF CONTROLLING THE SAME, AND STORAGE MEDIUM

(71) Applicant: KONICA MINOLTA, INC., Tokyo (JP)

(72) Inventor: Hisashi Uchida, Kyoto (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/813,972

(22) Filed: Mar. 10, 2020

(65) Prior Publication Data

US 2020/0304672 A1 Sep. 24, 2020

(30) Foreign Application Priority Data

Mar. 19, 2019 (JP) .............................. JP2019-051501

(51) Int. Cl.
*G06F 15/00* (2006.01)
*H04N 1/00* (2006.01)
*H04N 1/387* (2006.01)

(52) U.S. Cl.
CPC ..... *H04N 1/00872* (2013.01); *H04N 1/00846* (2013.01); *H04N 1/3871* (2013.01)

(58) Field of Classification Search
CPC ........... H04N 1/00872; H04N 1/00846; H04N 1/3871

USPC ......................................................... 358/1.15
See application file for complete search history.

(56) References Cited

U.S. PATENT DOCUMENTS

| 6,470,168 B1 * | 10/2002 | Fuss ........................ G07D 7/121 399/366 |
| 2002/0033971 A1 * | 3/2002 | Takaki .................... H04N 1/333 358/448 |
| 2020/0336620 A1 * | 10/2020 | Kubo .................. H04N 1/00005 |

FOREIGN PATENT DOCUMENTS

JP H05014683 A 1/1993

* cited by examiner

*Primary Examiner* — Mark R Milia
(74) *Attorney, Agent, or Firm* — Buchanan Ingersoll & Rooney PC

(57) ABSTRACT

An image forming apparatus includes circuitry that binarizes image data, a memory, and a print engine unit that forms an image of the binarized image data. When the image data is low in resolution, the circuitry has the image data stored in the memory and thereafter performs on the image data, detection processing for detecting whether or not the image data includes a predetermined pattern before binarization processing. When the image data is high in resolution, the circuitry binarizes the image data, thereafter has the image data stored in the memory, thereafter further performs multivalue converting processing on the image data, and thereafter performs detection processing.

18 Claims, 10 Drawing Sheets

IMAGE FORMING APPARATUS, METHOD OF CONTROLLING THE SAME, AND STORAGE MEDIUM

The entire disclosure of Japanese Patent Application No. 2019-051501 filed on Mar. 19, 2019 is incorporated herein by reference in its entirety.

BACKGROUND

Technological Field

The present disclosure relates to an image forming apparatus and particularly to an image forming apparatus that performs detection processing for detecting whether or not a predetermined pattern is included.

Description of the Related Art

Quality of an image formed by an image forming apparatus such as a multi-functional peripheral (MFP) has recently been improved. With such backgrounds, significance of detection processing on image data for printing that had conventionally been performed for avoiding printing of a print prohibited image such as valuable paper or banknotes has become great. For such detection processing, for example, Japanese Laid-Open Patent Publication No. H05-014683 discloses a technique for performing detection processing after multivalue converting processing on binary image data.

SUMMARY

When image data are uniformly subjected to binarization processing and thereafter to multivalue converting processing and detection processing, however, accuracy in detection may be lower.

In a conventional image forming apparatus, timing of binarization of image data may be different depending on resolution of the image data. For example, image data high in resolution is binarized immediately after rasterization for minimizing an amount of data to internally be handled, and thereafter stored in a file memory. Image data low in resolution, on the other hand, is stored in a file memory after rasterization without being binarized, and thereafter read from the file memory and then binarized. When detection processing onto image data immediately before binarization is uniformly attempted, process delay may be caused. More specifically, when image data high in resolution is processed in succession to image data low in resolution, detection processing onto preceding image data is performed after storage into and from the file memory. Therefore, start of detection processing onto subsequent image data is delayed, which may cause delay in output of subsequent image data.

Dedicated circuitry for detection processing onto each of image data high in resolution and image data low in resolution may also be provided. In such a case, however, a circuit scale in an image forming apparatus is larger, which may lead to significant increase in cost for manufacturing an image forming apparatus.

Therefore, a technique for avoiding lowering in detection accuracy in detection processing while avoiding delay in processing of image data has been demanded.

To achieve at least one of the abovementioned objects, according to an aspect of the present invention, an image forming apparatus reflecting one aspect of the present invention comprises an image processing unit that binarizes image data and an image forming unit that forms an image of the binarized image data. The image processing unit includes a file memory. When the image data is low in resolution, the image data is stored in the file memory and thereafter subjected to detection processing for detecting whether or not the image data includes a predetermined pattern before binarization processing. When the image data is high in resolution, the image data is binarized, thereafter stored in the file memory, and thereafter subjected to multivalue converting processing and then to the detection processing.

To achieve at least one of the abovementioned objects, according to an aspect of the present invention, a method of controlling an image forming apparatus reflecting one aspect of the present invention comprises determining whether image data to be processed is high or low in resolution, when the image data is low in resolution, storing the image data in a file memory and thereafter performing detection processing on the image data before binarization processing, when the image data is high in resolution, binarizing the image data and thereafter storing the binarized image data in the file memory, and when the image data is high in resolution, reading the image data from the file memory, performing multivalue converting processing on the image data, and thereafter performing the detection processing for detecting whether or not the image data includes a predetermined pattern.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
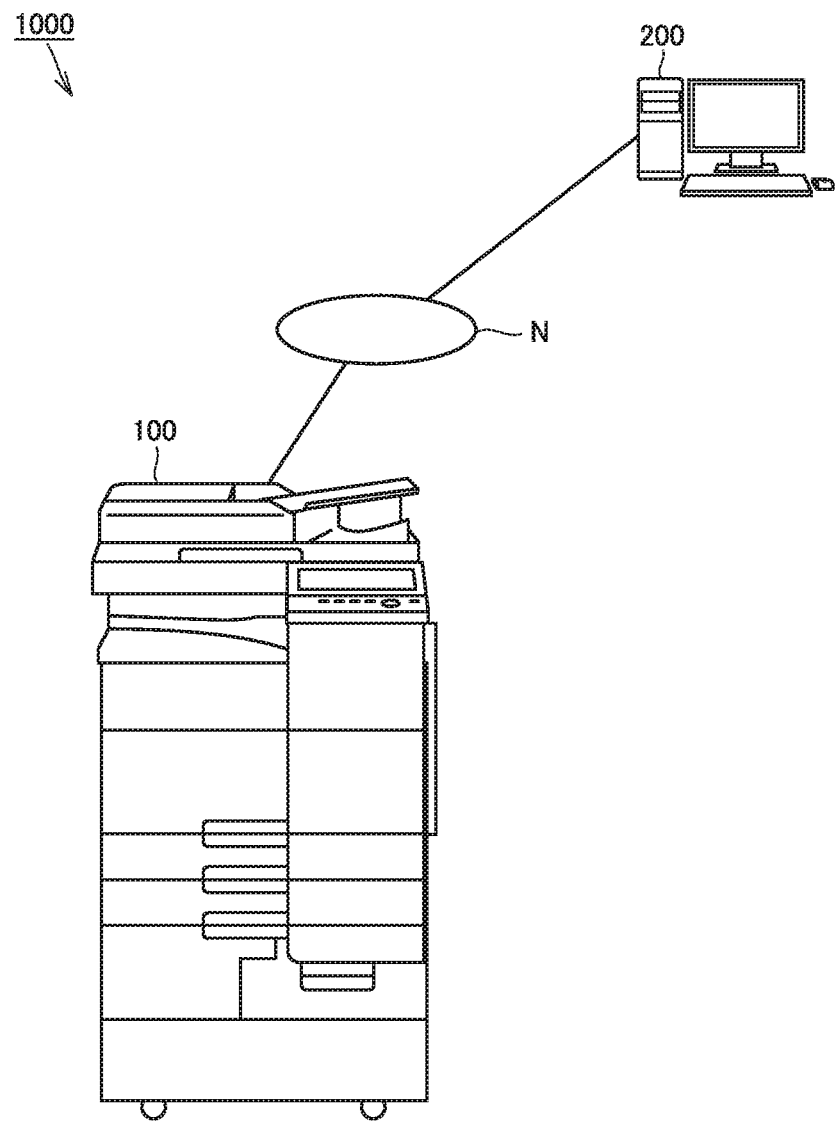
FIG. 1 is a diagram showing an exemplary manner of use of an image forming apparatus.

Hereinafter, one or more embodiments of the present invention will be described with reference to the drawings. However, the scope of the invention is not limited to the disclosed embodiments.

An embodiment of an image forming apparatus will be described below with reference to the drawings. The same elements and components in the description below have the same reference characters allotted and their labels and functions are also identical. Therefore, description thereof will not be repeated.

[Manner of Use of Image Forming Apparatus]

FIG. 1 is a diagram showing an exemplary manner of use of an image forming apparatus. As shown in FIG. 1, an image forming system 1000 includes an image forming apparatus 100 and a user terminal 200. Image forming apparatus 100 may be a multi-functional machine such as an MFP or a printer. User terminal 200 may be a general-purpose computer or a portable terminal such as a smart-phone. Image forming apparatus 100 and user terminal 200 can communicate with each other through a network N.

[Hardware Configuration of Image Forming Apparatus]

Figure 2:
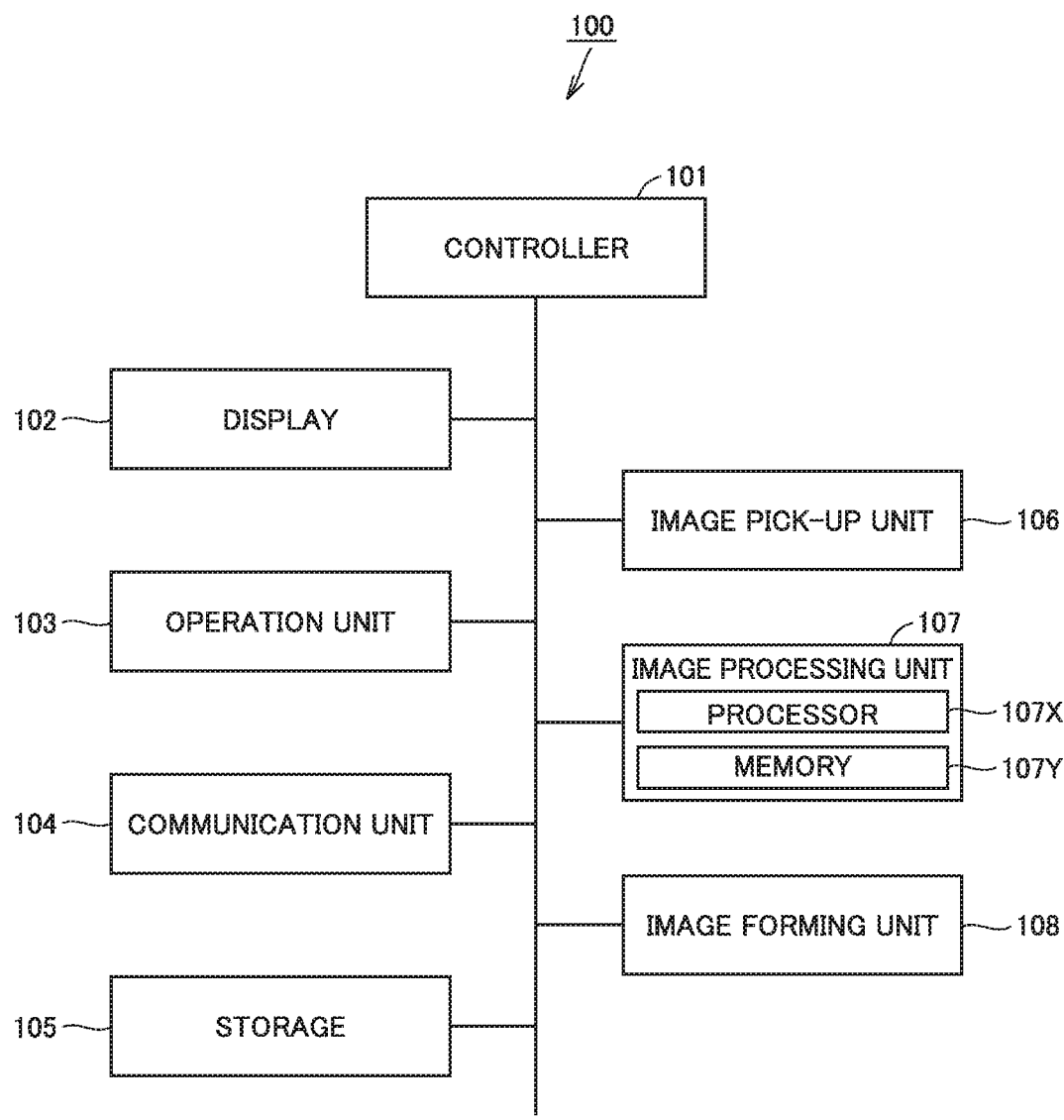
FIG. 2 is a diagram showing an exemplary hardware configuration of an image forming apparatus 100.

FIG. 2 is a diagram showing an exemplary hardware configuration of image forming apparatus 100.

Image forming apparatus 100 includes a controller 101 for overall control of image forming apparatus 100 Image forming apparatus 100 further includes a display 102, an operation unit 103, a communication unit 104, a storage 105, an image pick-up unit 106, an image processing unit 107, and an image forming unit 108. These components are connected to controller 101 through an internal bus.

Controller 101 includes a central processing unit (CPU). Display 102 is implemented, for example, by a display apparatus such as a liquid crystal display, an organic electro-luminescence (OEL) display, and/or an indicator. Operation unit 103 is implemented, for example, by an input apparatus such as a display (software key) and/or a hardware key.

Communication unit 104 is implemented, for example, by a communication interface such as a local area network (LAN) card. Storage 105 is implemented, for example, by a storage apparatus such as a hard disk drive (HDD) and/or a solid state drive (SSD). Image pick-up unit 106 is implemented, for example, by an image pick-up apparatus such as an image sensor.

Image processing unit 107 includes, for example, a processor (for example, circuitry) 107X that performs processing such as rasterization and binarization processing onto image data and a memory 107Y that stores data representing a result of processing.

Image forming unit 108 is implemented, for example, by a print engine unit that includes a photoconductor that forms an electrostatic latent image, an ink cartridge drive circuit for supplying ink for forming an image, a roller that transports printing paper, and a motor that drives the roller.

[Functional Configuration of Image Forming Apparatus]

Figure 3:
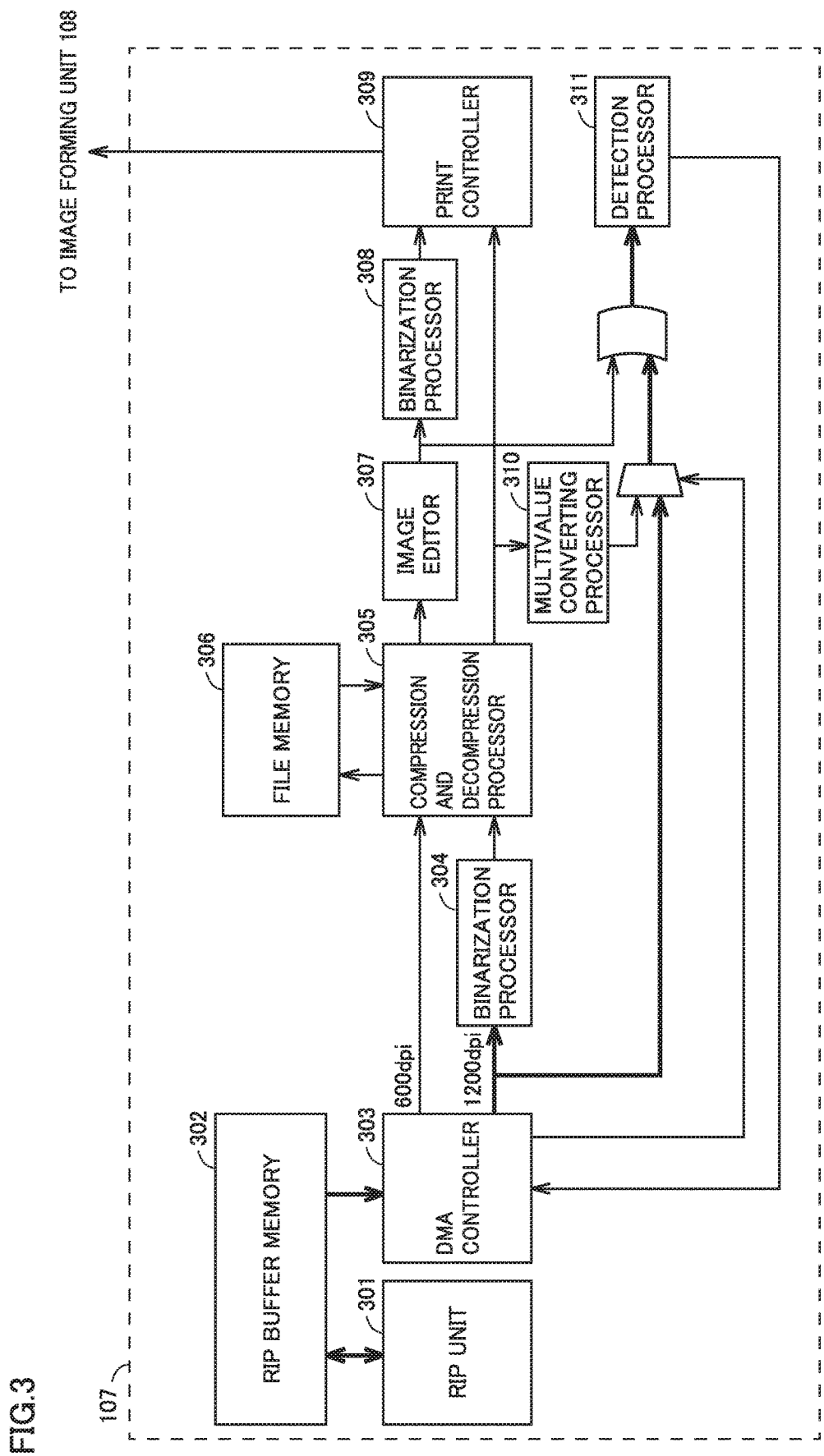
FIG. 3 is a diagram showing an exemplary functional configuration of an image processing unit 107.

FIG. 3 is a diagram showing an exemplary functional configuration of image processing unit 107. Image processing unit 107 includes a raster image processing (RIP) unit 301, an RIP buffer memory 302, a direct memory access (DMA) controller 303, a binarization processor 304, a compression and decompression processor 305, a file memory 306, an image editor 307, a binarization processor 308, a print controller 309, a multivalue converting processor 310, and a detection processor 311.

RIP unit 301, DMA controller 303, binarization processor 304, compression and decompression processor 305, image editor 307, binarization processor 308, print controller 309, multivalue converting processor 310, and detection processor 311 are each implemented by at least one processor. Each of them is implemented by execution of a given program by a general-purpose processor and/or a dedicated processor (for example, hardware such as an ASIC). RIP buffer memory 302 and file memory 306 are each implemented by a memory.

RIP unit 301 rasterizes input image data and has the rasterized image data stored in RIP buffer memory 302.

DMA controller 303 transfers image data stored in RIP buffer memory 302 to each element in image processing unit 107. More specifically, DMA controller 303 transfers image data categorized as image data high in resolution to binarization processor 304 and transfers image data categorized as image data low in resolution to compression and decompression processor 305. By way of example, DMA controller 303 categorizes image data having resolution not larger than a given threshold value as image data low in resolution and categorizes image data having resolution exceeding the threshold value as image data high in resolution. An exemplary threshold value is set to 600 dots per inch (dpi).

By way of example, image data of 600 dpi and image data of 1200 dpi may be input to image forming apparatus 100. In this case, image data of 600 dpi is handled as image data low in resolution and image data of 1200 dpi is handled as image data high in resolution.

Binarization processor 304 binarizes image data. DMA controller 303 transfers image data binarized by binarization processor 304 to compression and decompression processor 305.

Compression and decompression processor 305 compresses image data. DMA controller 303 transfers compressed image data to file memory 306.

DMA controller 303 transfers image data input as image data high in resolution among image data stored in file memory 306 to multivalue converting processor 310 as necessary, after decompression by compression and decompression processor 305. DMA controller 303 transfers image data input as image data low in resolution among image data stored in file memory 306 to image editor 307 after decompression by compression and decompression processor 305.

Image editor 307 performs edition processing on image data. Enlargement processing represents one example of edition processing and reduction processing represents another example. DMA controller 303 transfers image data edited by image editor 307 to binarization processor 308 and detection processor 311.

Binarization processor 308 binarizes image data.

Multivalue converting processor 310 performs multivalue converting processing on image data. Multivalue converting processor 310 may perform multivalue converting processing on image data so as to lower resolution thereof to be lower than resolution at the time of input of the image data. For example, image data at resolution of 1200 dpi input to image processing unit 107 is binarized and thereafter converted to multi-valued data at resolution of 600 dpi.

When image data input to image processing unit 107 is high in resolution, DMA controller 303 transfers the image data read from RIP buffer memory 302 or the image data processed by multivalue converting processor 310 to detection processor 311 in accordance with a condition which will be described later with reference to FIG. 4.

Detection processor 311 performs detection processing for detecting a specific image pattern in the image data. Examples of the specific image pattern include a pattern that constitutes an image of which output is prohibited, such as an image of banknotes. Detection processor 311 outputs a result of detection processing to DMA controller 303.

On condition that the image data has been determined as not including the specific image pattern in detection processing, DMA controller 303 transfers image data high in resolution decompressed by compression and decompression processor 305 or image data low in resolution binarized by binarization processor 308 to print controller 309.

When the image data has been determined as including the specific image pattern in detection processing, DMA controller 303 does not transfer the image data to print controller 309. Formation of an image in accordance with image data that may include the specific image pattern in image forming apparatus 100 is thus avoided. In this case, DMA controller 303 may notify controller 101 of a result of detection processing onto the image data. In response, controller 101 may have display 102 show information indicating that the image data (may) contains an image of which printing is prohibited.

Print controller 309 transfers the image data to image forming unit 108 and controls image forming unit 108 to form an image in accordance with the image data on a recording medium such as printing paper.

[Flow of Processing]

Figure 4:
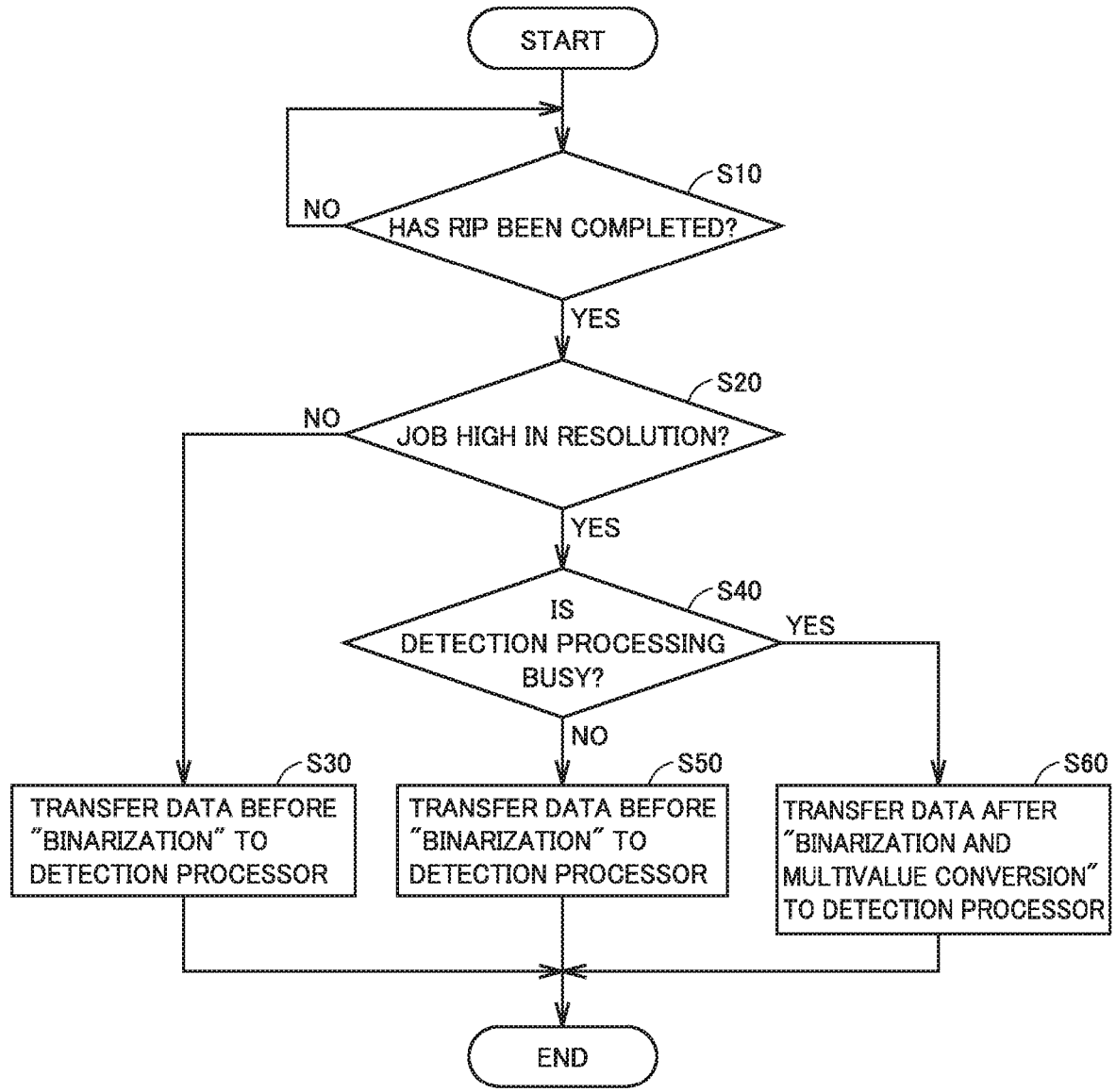
FIG. 4 is a flowchart of processing in image processing unit 107 for transferring input image data to a detection processor 311.

FIG. 4 is a flowchart of processing in image processing unit 107 for transferring input image data to detection processor 311. The processing is performed by a hardware element implementing DMA controller 303 and performed by execution of a given program by a given hardware element (circuitry) by way of example.

The processing in FIG. 4 is started, for example, in response to input of an instruction to execute a print job from user terminal 200 to image forming apparatus 100. The processing in FIG. 4 should only be started in response to an instruction to execute a job including formation of an image, and may be started in response to an instruction to execute a copy job (for example, pressing of a copy button) in image forming apparatus 100.

In step S10, DMA controller 303 determines whether or not RIP (rasterization by RIP unit 301) of image data input to image processing unit 107 has been completed. When DMA controller 303 determines that RIP has not yet been completed, the process stays in step S10 (NO in step S10), and when it determines that RIP has been completed, the DMA controller allows control to proceed to step S20 (YES in step S10).

In step S20, DMA controller 303 determines whether or not image data in a job from which an image is formed is high in resolution. In one example, when a file of which printing is indicated in a job includes an image high in resolution, DMA controller 303 determines the image data as being high in resolution (for example, resolution exceeding 600 dpi) and determines the image data as being in high in resolution. In another example, when the image data does not include an image high in resolution, DMA controller 303 determines the image data as not being high in resolution. When DMA controller 303 determines the image data as being high in resolution, the DMA controller allows control to proceed to step S40 (YES in step S20), and otherwise, the DMA controller allows control to proceed to step S30 (NO in step S20).

In step S30, DMA controller 303 transfers image data edited by image editor 307 and yet to be binarized by binarization processor 308 to detection processor 311 and quits the process in FIG. 4.

In step S40, DMA controller 303 determines whether or not detection processing is busy. In one example, the detection processing being busy means that image data in another job is being processed by detection processor 311. The detection processing not being busy means that image data is not being processed by detection processor 311. When DMA controller 303 determines that the detection processing is busy, the DMA controller allows control to proceed to step S60 (YES in step S40), and when it determines that the detection processing is not busy, the DMA controller allows control to proceed to step S50 (NO in step S40).

In step S50, DMA controller 303 transfers image data binarized by binarization processor 304 and thereafter subjected to multivalue converting processing in multivalue converting processor 310 to detection processor 311 and quits the process in FIG. 4.

In step S60, DMA controller 303 transfers image data yet to be binarized by binarization processor 304 (the image data read from RIP buffer memory 302) to detection processor 311 and quits the process in FIG. 4.

[Timing Chart]

FIGS. 5 to 8 each show an exemplary timing chart of processing in the image processing unit in image forming apparatus 100 according to the present disclosure or an image forming apparatus in a comparative example. Each of FIGS. 5 to 8 shows a timing chart in execution of two successive print jobs (a "job 1" and a "job 2" in each figure). In each example shown in FIGS. 5 to 8, each of "job 1" and "job 2" represents a job for a file including image data of three pages.

Each of FIGS. 5 to 8 shows processing performed onto image data, such as "RIP". More specifically, RIP (rasterization) A1 by RIP unit 301, compression processing A2 and decompression processing A3 by compression and decompression processor 305, image edition A4 by image editor 307, binarization processing A5 by binarization processor 308, detection processing X by detection processor 311, and print processing Y by print controller 309 are shown as processing performed onto image data low in resolution.

Figure 7:
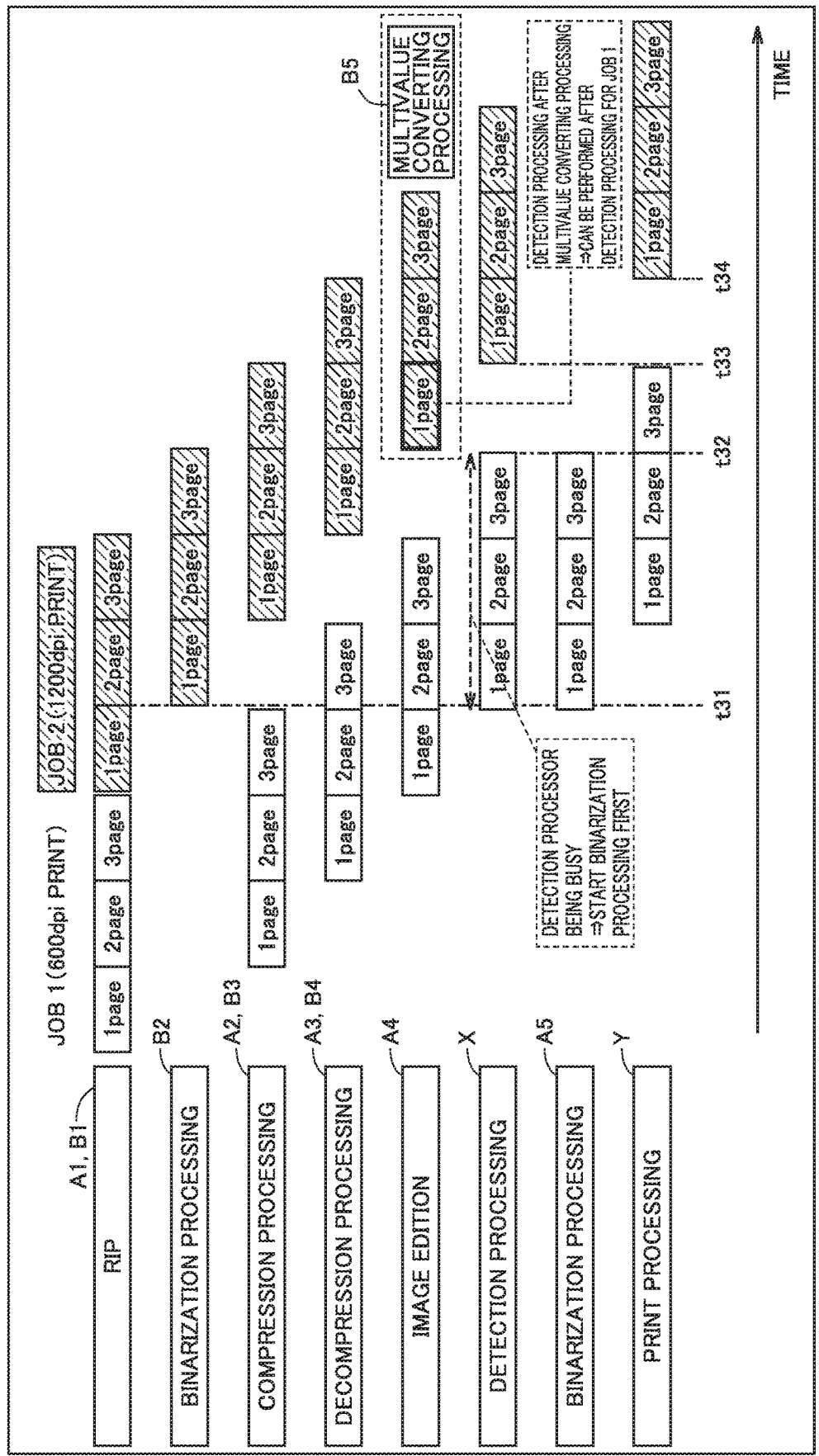
FIG. 7 is a diagram showing yet another exemplary timing chart of processing in the image processing unit in image forming apparatus 100 according to the present disclosure.

RIP (rasterization) B1 by RIP unit 301, binarization processing B2 by binarization processor 304, compression processing B3 and decompression processing B4 by compression and decompression processor 305, detection processing X by detection processor 311, and print processing Y by print controller 309 are shown as processing performed onto image data high in resolution. FIG. 7 further shows multivalue converting processing B5 by multivalue converting processor 310.

In each of FIGS. 5 to 8, the abscissa represents lapse of time. FIGS. 5 to 8 show on which page in which job image data is subjected to each type of processing. Each of FIGS. 5 to 8 will be described below.

Figure 5:
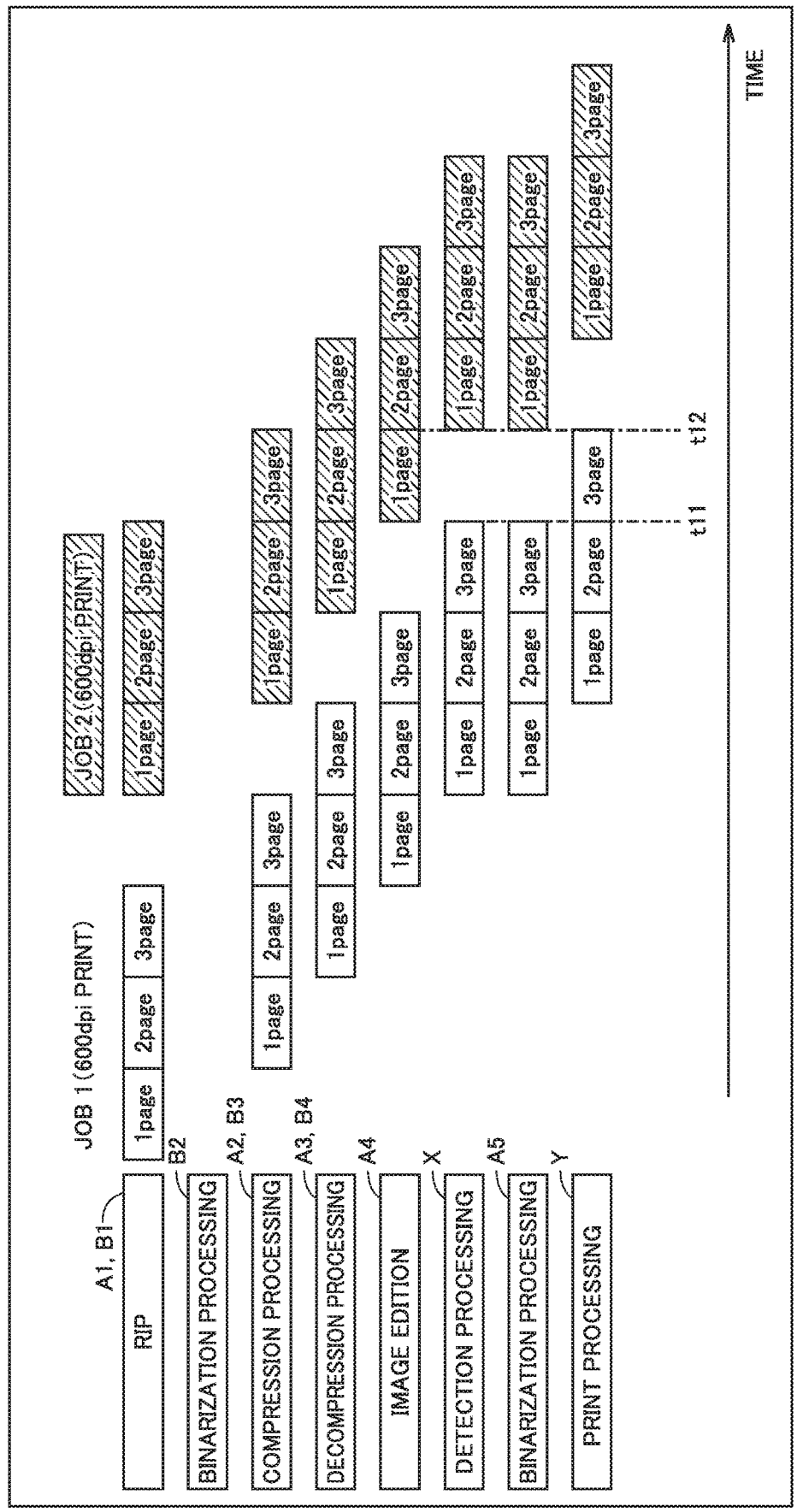
FIG. 5 is a diagram showing an exemplary timing chart of processing in the image processing unit in image forming apparatus 100 according to the present disclosure.

(FIG. 5: Example in Which Jobs Low in Resolution Are Successively Executed)

In an example in FIG. 5, each of job 1 and job 2 is a print job for printing image data low in resolution. As shown in FIG. 5, initially, image data on a first page in job 1 is subjected to RIP A1. When RIP on the image data on the first page in job 1 is completed, image data on the first page is transferred to compression and decompression processor 305 and RIP A1 on image data on a second page is performed. Image data on each of the first page to a third page in job 1 is sequentially processed in RIP A1, compression processing A2, decompression processing A3, image edition A4, and binarization processing A5. Each piece of image data is processed in detection processing X in parallel to processing in binarization processing A5. As detection processing X for each page is completed, print processing Y onto that page is performed on condition that the specific image pattern described above was not detected in the detection processing.

In the example in FIG. 5, after RIP A1 onto the last page (the third page) in job 1, RIP A1 onto a top page (a first page) in job 2 is started. For job 2 as well, image data on each of the first page to the third page is sequentially processed in RIP A1, compression processing A2, decompression processing A3, image edition A4, and binarization processing A5.

In the example in FIG. 5, image edition A4 of the first page in job 2 ends at time t12. Detection processing X onto the third page in job 1 ends at time t11 before time t12. In other words, detection processing X onto the top page in job 2 can be started without waiting for the end of detection processing X onto the last page in job 1. Thus, in processing of the image data in job 2, delay which may be caused by waiting for processing onto the image data in job 1 is avoided.

Figure 6:
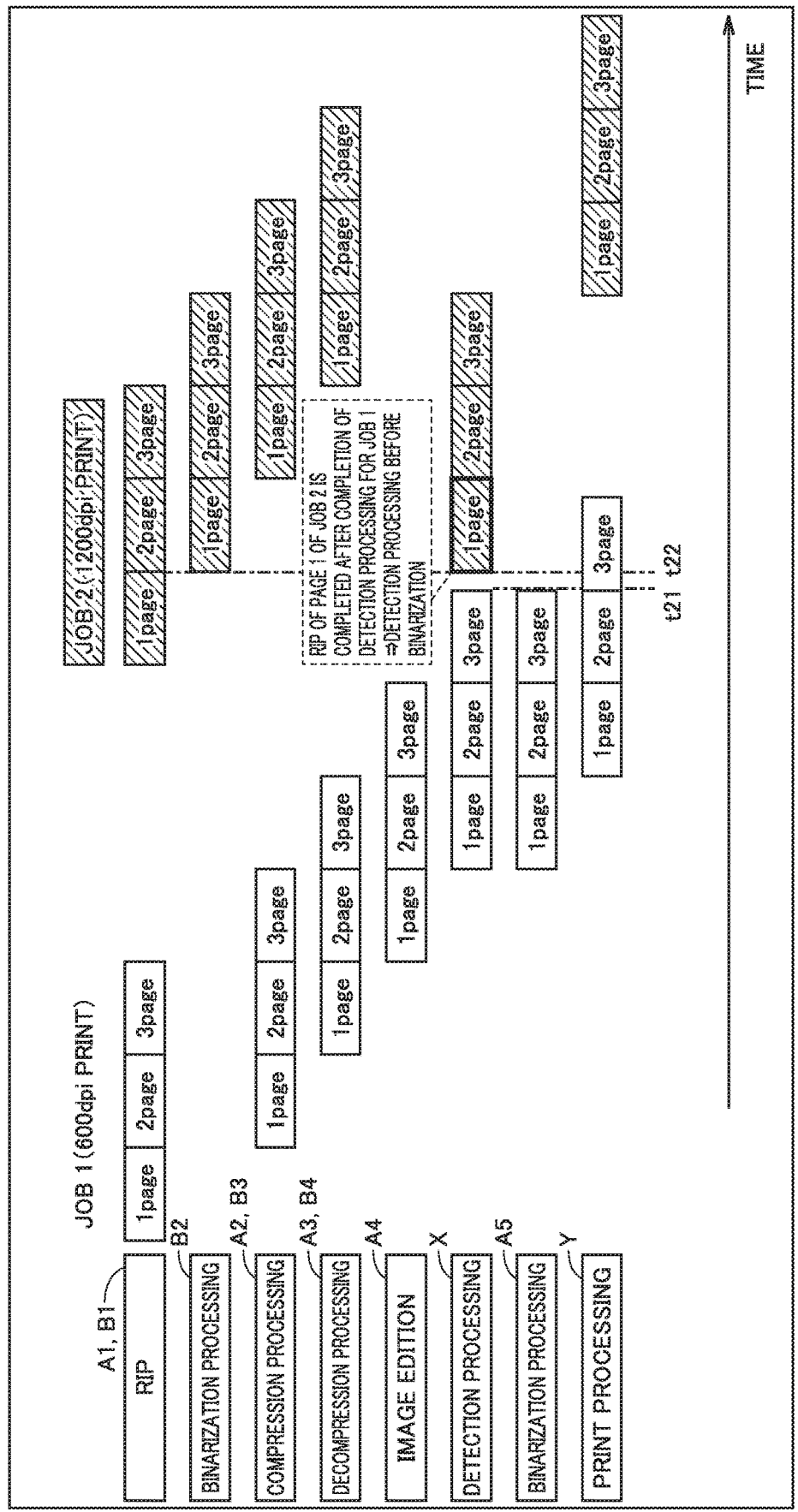
FIG. 6 is a diagram showing another exemplary timing chart of processing in the image processing unit in image forming apparatus 100 according to the present disclosure.

(FIG. 6: Example (1) in Which Job High in Resolution Is Executed After Job Low in Resolution)

In an example in FIG. 6, job 1 is a print job for printing image data low in resolution and job 2 is a print job for printing image data high in resolution.

In the example in FIG. 6 as well, as in the example in FIG. 5, image data on each of the first page to the third page in job 1 is sequentially processed in RIP A1, compression processing A2, decompression processing A3, image edition A4, and binarization processing A5. Each piece of image data is processed in detection processing X in parallel to processing in binarization processing A5. When detection processing X onto each page is completed, print processing Y onto that page is performed on condition that the specific image pattern described above was not detected in the detection processing.

In the example in FIG. 6, RIP B1 onto a first page in job 2 is started at the timing of end of the print processing onto the first page in job 1. Thereafter, image data on each of the first page to the third page also in job 2 is sequentially processed in RIP B1, binarization processing B2, compression processing B3, and decompression processing B4.

In the example in FIG. 6, at time t22, RIP B1 onto the first page in job 2 ends and binarization processing B2 is started. Detection processing X onto the last page in job 1 ended at time t21 before time t22. In other words, image processing unit 107 (DMA controller 303) can determine that detection processing X is not busy at the time when it attempts binarization processing B2 onto the first page in job 2 (NO in step S40 in FIG. 4). Therefore, in the example in FIG. 6, image data before binarization processing B2 is processed in detection processing X.

In the example in FIG. 6, detection processing onto image data in job 2 is performed without waiting for end of detection processing onto the image data in job 1 and image data before binarization processing B2 (which remains high in resolution) can be processed.

(FIG. 7: Example (2) in Which Job High in Resolution Is Executed After Job Low in Resolution)

In an example in FIG. 7, as in the example in FIG. 6, job 1 is a print job for printing image data low in resolution and job 2 is a print job for printing image data high in resolution.

In the example in FIG. 7 as well, as in the example in FIG. 6, image data on each of the first page to the third page in job 1 is sequentially processed in RIP A1, compression processing A2, decompression processing A3, image edition A4, and binarization processing A5. Each piece of image data is processed in detection processing X in parallel to processing in binarization processing A5. When detection processing X onto each page is completed, print processing Y onto that page is performed on condition that the specific image pattern described above was not detected in the detection processing.

In the example in FIG. 7, RIP B1 onto image data on the first page in job 2 is started in a relatively early stage after the end of RIP A1 onto the last page (the third page) in job 1. Therefore, for image data on the first page in job 2, at the timing (time t31) of completion of RIP B1 and start of binarization processing B2, detection processing X onto image data on the last page in job 1 has not yet ended. Detection processing X onto the image data on the last page in job 1 ends at time t32 after time t31. In other words, at time t31, detection processing X is determined as being busy (YES in step S40).

Then, in the example in FIG. 7, image processing unit 107 (DMA controller 303) performs detection processing X onto image data in job B2 that has been subjected to binarization processing B2, compression processing B3, decompression processing B4, and multivalue converting processing B5, as described as control in step S60. Detection processing X onto the image data on the first page in job 2 is thus started at time t33 after time t32.

In the example in FIG. 7, image processing unit 107 performs detection processing onto image data low in resolution before it is binarized. Lowering in accuracy in detection processing can thus be avoided Image processing unit 107 performs detection processing onto image data high in resolution after it is subjected to multivalue converting processing even though it has been binarized. Thus, in a scene where a job (image data) high in resolution is executed after a job (image data) low in resolution, delay in start of detection processing for the job high in resolution that may be caused by waiting for detection processing for the job low in resolution can be avoided. In such a scene, delay in processing can be avoided while lowering in accuracy in detection processing is avoided.

Figure 8:
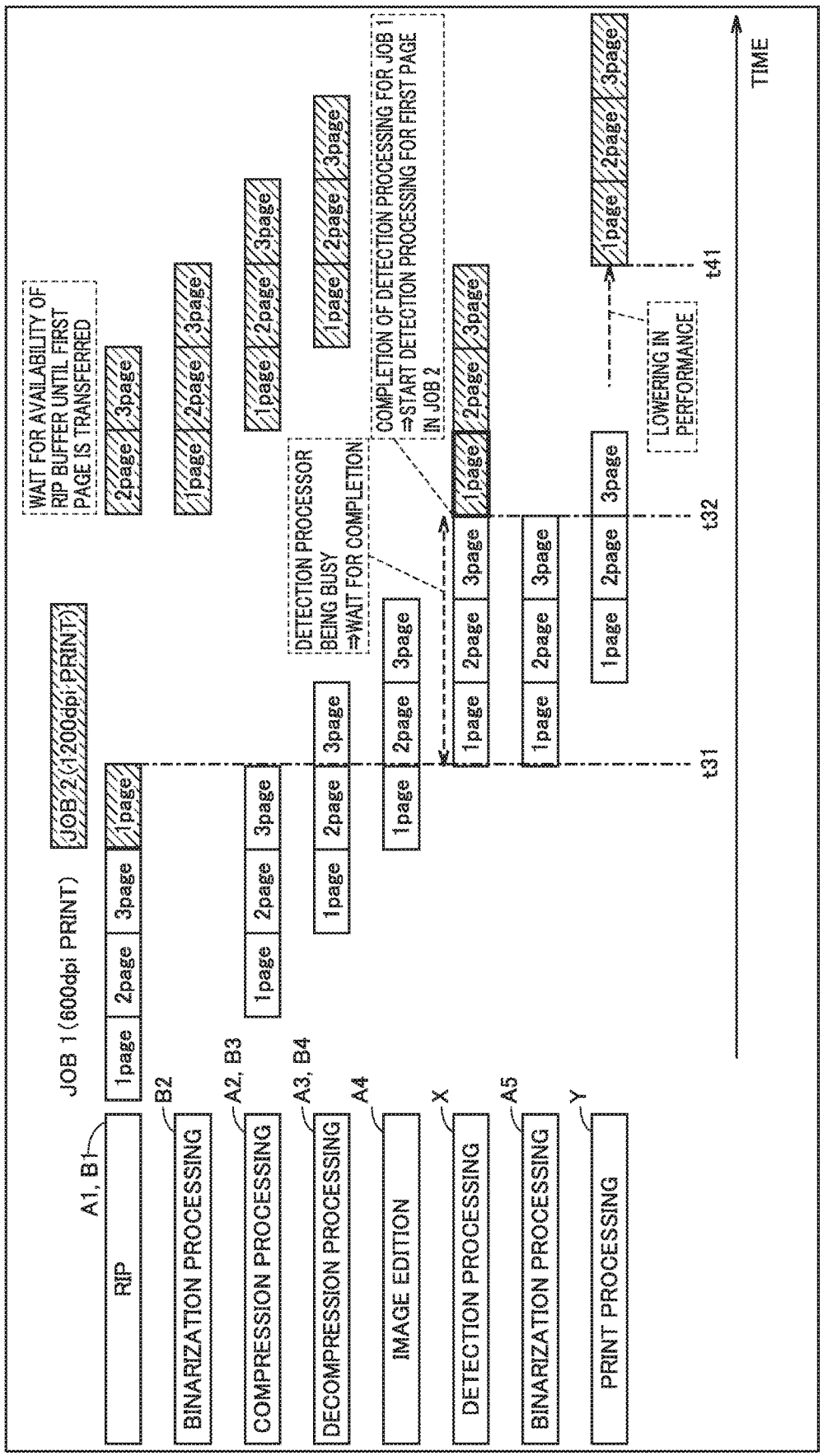
FIG. 8 is a diagram showing an exemplary timing chart of processing in the image processing unit in an image forming apparatus according to a comparative example.

(FIG. 8: Example (3) in Which Job High in Resolution Is Executed After Job Low in Resolution)

In an example in FIG. 8, as in the example in FIG. 7, job 1 is a print job for printing image data low in resolution and job 2 is a print job for printing image data high in resolution. The example in FIG. 8 is a comparative example with respect to the example in FIG. 7 and does not include multivalue converting processing B5. The comparative example shown in FIG. 8 will be described in further detail with reference to FIGS. 9 and 10.

Figure 9:
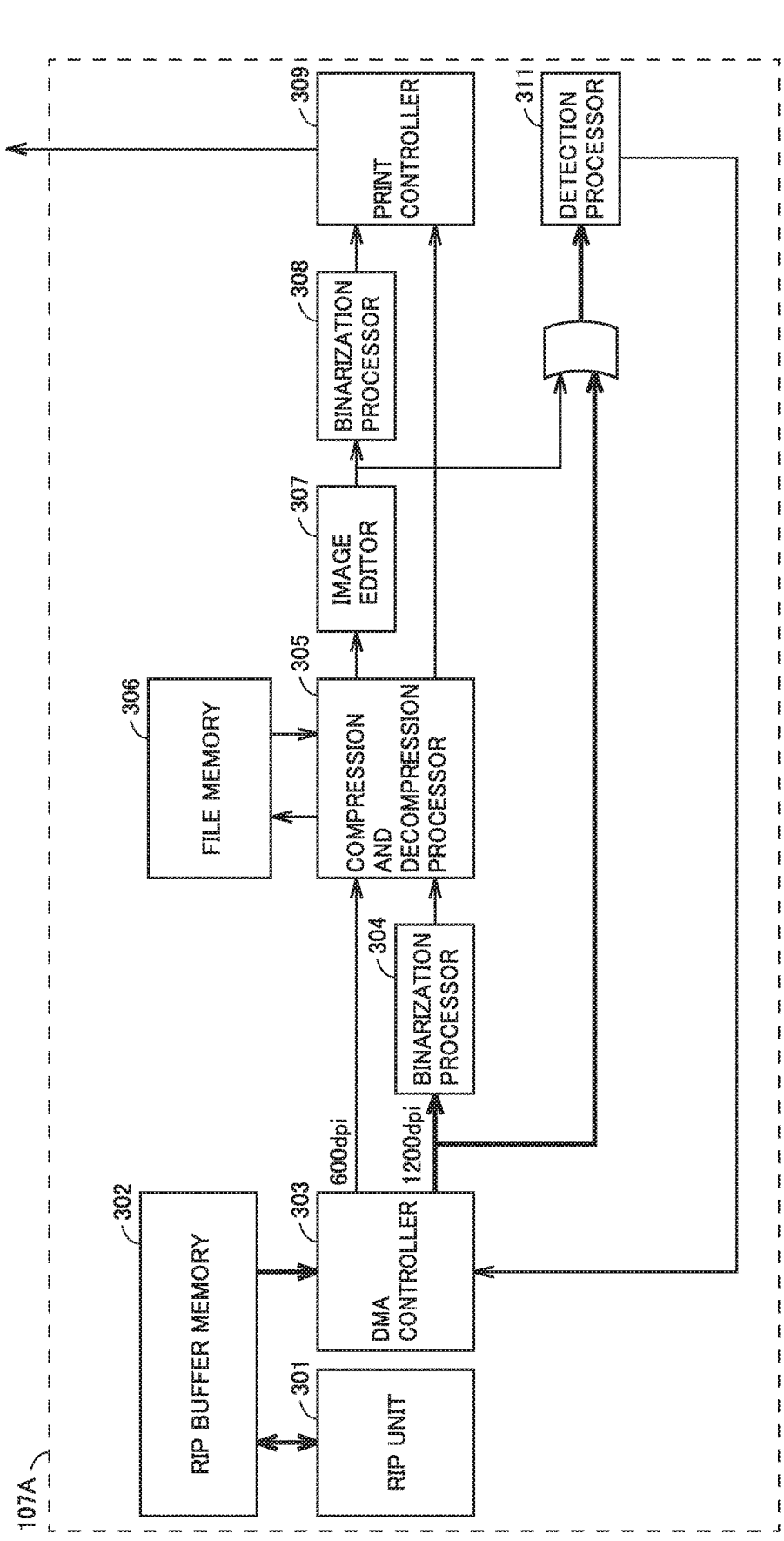
FIG. 9 is a diagram showing an exemplary configuration of an image processing unit 107A corresponding to the example in FIG. 8.
Figure 10:
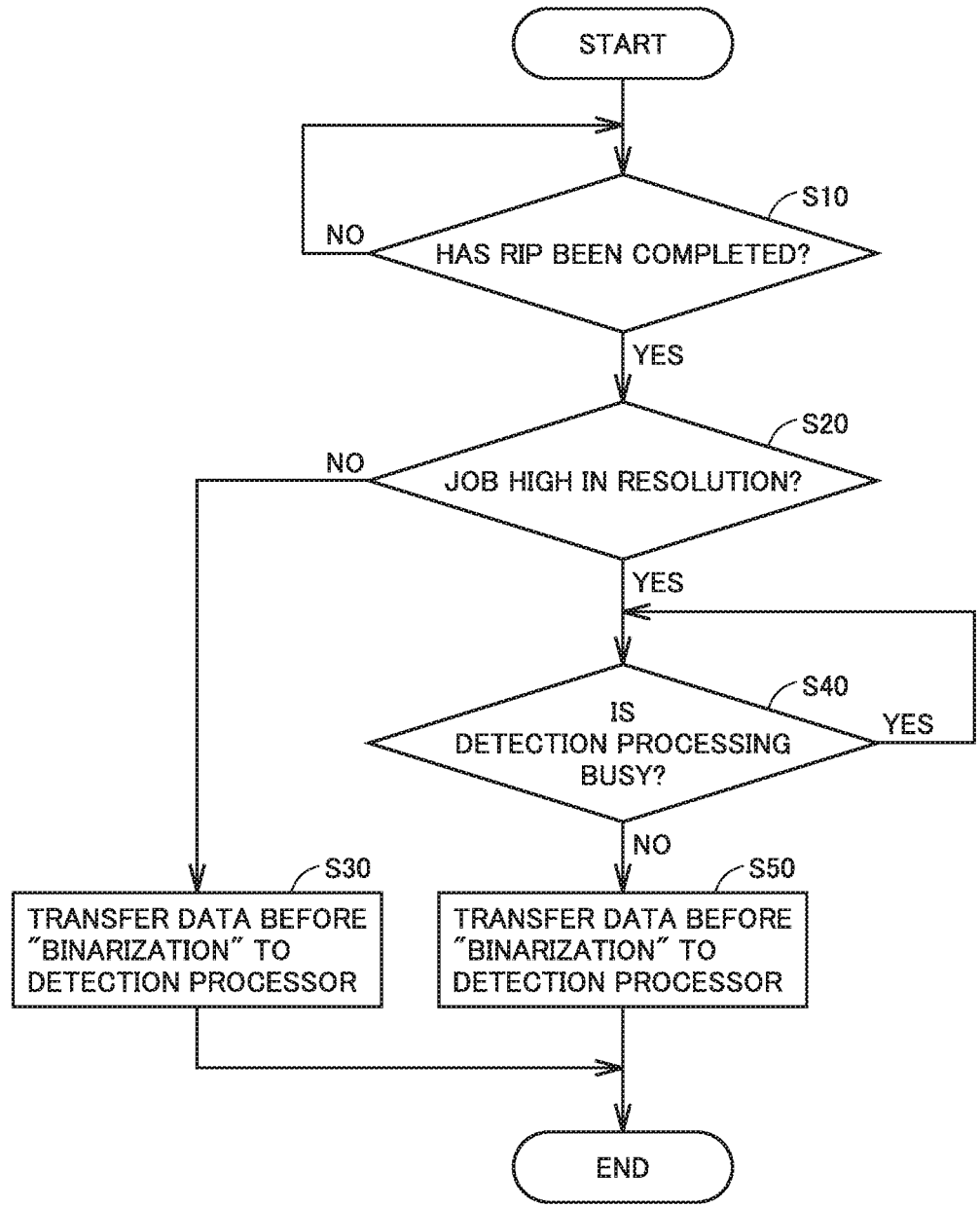
FIG. 10 is a flowchart of processing corresponding to the example in FIG. 8 for transferring image data input to image processing unit 107A to the detection processor.

FIG. 9 is a diagram showing an exemplary configuration of an image processing unit 107A corresponding to the example in FIG. 8. FIG. 10 is a flowchart of processing corresponding to the example in FIG. 8 for transferring image data input to image processing unit 107A to the detection processor. The configuration in FIG. 9 does not include multivalue converting processor 310 as compared with the configuration in FIG. 3. In the example in FIG. 9, when image data is high in resolution, DMA controller 303 transfers image data before binarization processing to detection processor 311. When detection processor 311 is performing detection processing onto another piece of image data, DMA controller 303 transfers next image data to detection processor 311 after end of detection processing onto that image data.

In processing in FIG. 10, as compared with the processing in FIG. 4, when DMA controller 303 determines that the detection processing is busy (YES in step S40), it has control stay in step S40 until the detection processing is no longer busy. DMA controller 303 transfers image data to detection processor 311 on condition that it determines that the detection processing is not busy (NO in step S40).

Referring back to FIG. 8, even when RIP B1 onto image data in job 2 ends at time t31, image data in job 1 is being processed in detection processing X. Therefore, DMA controller 303 is unable to transfer image data on the first page in job 2 from RIP buffer memory 302 to detection processor 311. Since image data on the first page is stored in RIP buffer memory 302, RIP unit 301 is unable to start RIP onto image data on the second page in job 2.

At time t32, DMA controller 303 starts transfer of image data on the first page in job 2 to detection processor 311. DMA controller 303 thus starts RIP onto image data on the second page in job 2 at time t32. Since the example in FIG. 8 does not include multivalue converting processing B5, there is no path through which image data proceeds to binarization processing B2, compression processing B3, and decompression processing B4 after RIP B1. Thus, start of RIP onto image data on the second page in job 2 is significantly delayed as compared with the example in FIG. 7 and hence start of processing onto image data on the second page in binarization processing B2 or later is also delayed. Thus, even when detection processing X onto each page in job 2 ends early, end of decompression processing B4 is later than in the example in FIG. 7 and consequently start of print processing Y is delayed (time t41).

In other words, in the example in FIG. 7, with progress of detection processing X onto image data in job 1 before job 2, DMA controller 303 can select whether image data before binarization processing B2 or image data after binarization processing B2 and after multivalue converting processing B5 should be subjected to detection processing X. Thus, image forming apparatus 100 can avoid lowering in accuracy in detection processing and delay in processing as much as possible.

Although embodiments of the present invention have been described and illustrated in detail, the disclosed embodiments are made for purposes of illustration and example only and not limitation. The scope of the present invention should be interpreted by terms of the appended claims

What is claimed is:

1. An image forming apparatus comprising:
   circuitry that binarizes image data;
   a memory; and
   a print engine unit that forms an image of the binarized image data, wherein
   when the image data is low in resolution, the circuitry has the image data stored in the memory and thereafter performs, on the image data low in resolution, detection processing for detecting whether the image data low in resolution includes a predetermined pattern before binarization processing, and
   when the image data is high in resolution, the circuitry binarizes the image data high in resolution, thereafter has the image data high in resolution stored in the memory, thereafter further performs multivalue converting processing on the image data high in resolution, and thereafter performs the detection processing on the image data high in resolution for detecting whether the image data includes the predetermined pattern.

2. The image forming apparatus according to claim 1, wherein
   when first image data is high in resolution, in the binarization processing on the first image data,
      while the detection processing on second image data is being performed, the circuitry performs the multivalue converting processing on the first image data and thereafter performs the detection processing, and
      when there is no image data to be subjected to the detection processing, the circuitry performs the detection processing on the first image data before the binarization processing.

3. The image forming apparatus according to claim 1, wherein
   the multivalue converting processing includes lowering resolution of the image data.

4. The image forming apparatus according to claim 1, wherein
   when the image data is low in resolution, the circuitry has the image data stored in the memory and thereafter performs the detection processing on the image data after edition processing and before the binarization processing.

5. The image forming apparatus according to claim 2, wherein
   the multivalue converting processing includes lowering resolution of the image data.

6. The image forming apparatus according to claim 2, wherein
   when the image data is low in resolution, the circuitry has the image data stored in the memory and thereafter performs the detection processing on the image data after edition processing and before the binarization processing.

7. A method of controlling an image forming apparatus, comprising:
   determining whether image data to be processed is high or low in resolution;
   when the image data is low in resolution, storing the image data low in resolution in a memory and thereafter performing on the image data low in resolution, detection processing for detecting whether the image data low in resolution includes a predetermined pattern before binarization processing;
   when the image data is high in resolution, binarizing the image data high in resolution and thereafter storing the image data high in resolution in the memory; and
   when the image data is high in resolution, reading the image data high in resolution from the memory, performing multivalue converting processing on the image data high in resolution, and thereafter performing the detection processing on the image data high in resolution for detecting whether the image data includes the predetermined pattern.

8. The method according to claim 7, further comprising determining whether the detection processing on another piece of image data is being performed before the binarization processing, wherein
   when the detection processing on another piece of image data is being performed, the detection processing on the image data is performed after the multivalue converting processing, and
   when the detection processing on another piece of image data is not being performed, the detection processing is performed on the image data before the multivalue converting processing and the binarization processing.

9. The method according to claim 7, wherein
   the multivalue converting processing includes lowering resolution of the image data.

10. The method according to claim 7, wherein
   when the image data is low in resolution, the method includes storing the image data in the memory and thereafter performing the detection processing on the image data after edition processing and before the binarization processing.

11. The method according to claim 8, wherein
the multivalue converting processing includes lowering resolution of the image data.

12. The method according to claim 8, wherein
when the image data is low in resolution, the method includes storing the image data in the memory and thereafter performing the detection processing on the image data after edition processing and before the binarization processing.

13. A non-transitory computer-readable storage medium having a program stored thereon, the program, when executed by at least one processor, causing the at least one processor to perform the method according to claim 7.

14. A non-transitory computer-readable storage medium having a program stored thereon, the program, when executed by at least one processor, causing the at least one processor to perform the method according to claim 8.

15. A non-transitory computer-readable storage medium having a program stored thereon, the program, when executed by at least one processor, causing the at least one processor to perform the method according to claim 9.

16. A non-transitory computer-readable storage medium having a program stored thereon, the program, when executed by at least one processor, causing the at least one processor to perform the method according to claim 10.

17. A non-transitory computer-readable storage medium having a program stored thereon, the program, when executed by at least one processor, causing the at least one processor to perform the method according to claim 11.

18. A non-transitory computer-readable storage medium having a program stored thereon, the program, when executed by at least one processor, causing the at least one processor to perform the method according to claim 12.

* * * * *